United States Patent [19]

Cholkeri et al.

[11] Patent Number: 4,778,105

[45] Date of Patent: Oct. 18, 1988

[54] CONTROL DEVICE

[75] Inventors: Pandu R. Cholkeri, Worthington; William A. Anklam, Delaware, both of Ohio

[73] Assignee: Ranco Incorporated of Delaware, Dublin, Ohio

[21] Appl. No.: 574,660

[22] Filed: Jan. 27, 1984

[51] Int. Cl.[4] .............................................. G05D 23/12

[52] U.S. Cl. .................................... 236/99 R; 285/115

[58] Field of Search ............. 236/99 B, 99 R; 403/41; 285/115, 116; 248/51

[56] References Cited

U.S. PATENT DOCUMENTS

| | | | |
|---|---|---|---|
| 957,325 | 5/1910 | Garrett | 285/116 |
| 2,045,289 | 6/1936 | Bolin | 236/99 R |
| 2,147,021 | 2/1939 | Ford | 285/115 |
| 2,508,638 | 5/1950 | Bricker | 285/115 X |
| 2,810,525 | 10/1957 | Wantz | 236/99 R X |
| 4,175,779 | 11/1979 | Apblett, Jr. | 285/115 |

FOREIGN PATENT DOCUMENTS

| | | | |
|---|---|---|---|
| 2040014 | 8/1980 | United Kingdom | 285/115 |

*Primary Examiner*—William E. Tapolcai

*Attorney, Agent, or Firm*—Watts, Hoffmann, Fisher & Heinke

[57] ABSTRACT

A control device is disclosed comprising a supporting housing assembly, a controller switch fixed to the housing, an expansible chamber actuator supported by the housing for actuating the switch, a capillary tube joined to the actuator, and a vibration damper for minimizing vibrational flexure of the capillary tube, the damper defining a first end fixed to the housing, a second end remote from the housing and a passage extending between the ends closely surrounding the capillary tube.

7 Claims, 2 Drawing Sheets

CONTROL DEVICE

TECHNICAL FIELD

The present invention relates to control devices and more particularly to control devices for sensing pressure or temperature employing fluid filled capillary tubes.

BACKGROUND ART

Temperature and pressure control devices for refrigeration systems are frequently formed by a support housing containing a control switch or a valve operated by an expansible chamber actuator, such as a metal bellows. The actuator is rigidly fixed to the housing with the actuator chamber communicating with a small diameter thin walled tube frequently referred to as a capillary tube. The tube and actuator chamber contain an operating fluid and the tube functions to transmit fluid pressure to the actuator from a remote location.

The support housing assembly is quite commonly attached to the refrigerant compressor with the capillary tube extending from the housing to a desired location. The capillary tubes are formed to be relatively supple so that when a control device is installed the capillary tube can be manually bent to extend it to a desired location Typical capillary tubes are formed from soft copper which is coiled by the control manufacturer for shipment device and is uncoiled and shaped as desired by the user of the control device.

Capillary tubes used in pressure controls are formed with a pressure fitting at the tube end remote from the actuator. The remote tube end is open so that the capillary tube can be connected directly to a tap in a refrigerant system. Refrigerant at system pressure is thus communicated to the actuator chamber via the capillary tube.

In temperature sensing controls, the remote capillary tube end is hermetically sealed so that the capillary tube and actuator chamber form a sealed volume containing a thermally respnnsive fluid. The capillary tube is bent around to place part of the tube in heat transfer relationship with a part or space whose temperature is to be sensed. The actuator then is expanded or retracted according to the sensed temperature.

The actuators are normally formed from a high strength metal such as stainless steel. The actuator assemblies are hermetically welded together to provide strong fluid tight joints. The capillary tubes are generally connected to the actuators by a brazed joint because of the difference in the actuator and capillary tube materials. Typically the capillary tube end is inserted in a closely conforming sleeve-like extension of the actuator, flux and brazing compound is placed about the juncture and the tube and actuator are subjected to localized heating to complete the brazing operation. The brazing operation substantially heats a section of the capillary tue adjacent the actuator causing embrittlement of the tube end section near the brazed joint. The brazed joint itself is also brittle compared to the soft copper capillary tube.

In the past the brazed joints and relatively brittle capillary tube end sections have been subject to stress fractures during shipment and handling. This was particularly true when the capillary tubes were subjected to bending stresses near the control housing.

In order to minimize these occurrences it has been common to fix a helical stainless steel spring about the capillary tube extending from the actuator, across the brazed joint and along the tube to a location beyond the heat affected section. In some control devices a relatively stiff plastic sheath was fitted about the capillary tube in place of the coil spring. The presence of these devices tended to prevent the capillary tubes from breaking as a result of being kinked or sharply bent during shipping and handling.

Another problem which arose in the field was that of fatigue fracturing of the brazed joints or the embrittled capillary tube sections due to vibrations. Vibrations were induced in the capillary tubes and brazed joints as a result of the control housings being mounted on or in association ith a refrigerant compressor. The remote portion of the capillary tube formed spring and mass systems which tended to vibrate at different rates from the compressors. The compressors operated and induced vibrations in the capillary tubes which in turn transmitted cyclic flexural stresses to the brazed joints and adjacent tube sections. Fatigue fractures sometimes resulted from these cyclic stresses. The capillary tube stiffening springs and plastic sheaths did not eliminate or substantially reduce the occurrence of such failures.

When a capillary tube fracture occurred in a temperature control, the control failed and had to be replaced. When a failure occurred in a pressure control the control failed, but even worse the refrigerant system charge was vented to atmosphere. In many cases, loss of refrigerant charge was a more serious consequence than replacement of the control.

Failure of controls due to capillary tube fatigue fracturing was a more or less random occurrence which depended in large part on how good the brazed joint was, the degree of embrittlement of the capillary tube and how the capillary tube was bent and extended from the control housing. If the free length of the capillary tube was configured so that compressor vibrations were at or about the resonant frequency of the tube, the brazed joints or the embrittled section of the capillary tube would fail after a short period of use. If the capillary tube configuration was such that compressor induced vibrations were damped, the tubes did not tend to fail readily.

DISCLOSURE OF INVENTION

The present invention provides a new and improved control device having a fluid filled capillary tube for sensing pressure or temperature wherein the control device is constructed and arranged so that vibrations of the capillary tube adjacent the control housing are minimized to substantially reduce fatigue related capillary tube failures.

A control device constructed according to a preferred embodiment of the invention comprises a support housing assembly, an expansible chamber actuator, a capillary tube bonded to the actuator and a capillary tube supporting damper. The damper comprises a stiffly resilient damper body engaging and supporting the capillary tube at a location remote from its juncture with the actuator. Flexural forces which would otherwise be exerted on the capillary tube are transmitted from the location to the housing assembly via the damper body.

The preferred damper comprises a rubber-like tubular member fixed to the housing assembly adjacent the juncture of the capillary tube and actuator.

Another feature of the preferred damper member is that it is of generally frusto-conical configuration with the enlarged end defining a face bonded to the support housing assembly.

BEST MODE FOR CARRYING OUT THE INVENTION

Figure 1:
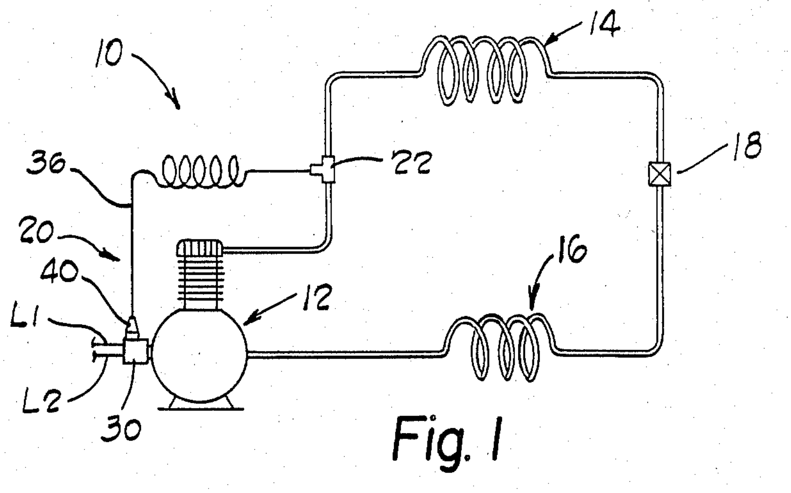
FIG. 1 is a schematic representation of the compressor-condenser-evaporator type refrigeration system embodying the present invention.

A compressor-condenser-evaporator type refrigeration system 10 is illustrated by FIG. 1 of the drawings and includes a refrigerant compressor 12, a refrigerant condenser 14, a refrigerant evaporator 16, an expansion valve 18 between the condenser and the evaporator, and a pressure control device 20.

The compressor 12 is of the piston-cylinder type and compresses a gaseous refrigerant for delivery to the condenser 14 through a refrigerant pipe between them. The high pressure refrigerant gas in the condenser is cooled and liquefied after which it is flowed through the expansion valve 18 via a pipe from the condenser. Refrigerant passing through the expansion valve 18 is flashed into its gaseous state again and delivered to the evaporator 16 where heat is transferred to the refrigerant from the surroundings of the evaporator. Refrigerant which has passed through the evaporator 16 returns to the suction inlet of the compressor 12.

The compressor 12 is operated by an electric motor (not illustrated) which is connected to a power supply via power lines L1, L2 through the pressure control device 20. The pressure control device 20 detects the existence of undesirably high compressor head pressures in the pipe between the compressor 12 and the condenser 14 and, when undesirably high pressures are detected, functions to interrupt the power supply to the compressor motor. The pressure control device 20 is communicated to the refrigerant pressure in the system 10 via a pressure tap 22 connected in the pipe between the compressor and condenser.

The control device 20 comprises a support housing assembly 30, a control switch 32 (schematically illustrated in FIGS. 2 and 4), an expansible chamber actuator 34 for operating the control switch 32, a capillary tube 36 for communicating pressure from the tap 22 to the actuator 34, and a capillary tube supporting damper 40 attached to the housing assembly 30 and the capillary tube 36. The control switch 32 is connected to the power lines L1, L2 and the compressor motor to complete and interrupt an energizing circuit for the compressor motor. The actuator 34 is effective to actuate the control switch 32 depending upon the level of the pressure delivered to the actuator 34 via the capillary tube 36.

Figure 2:
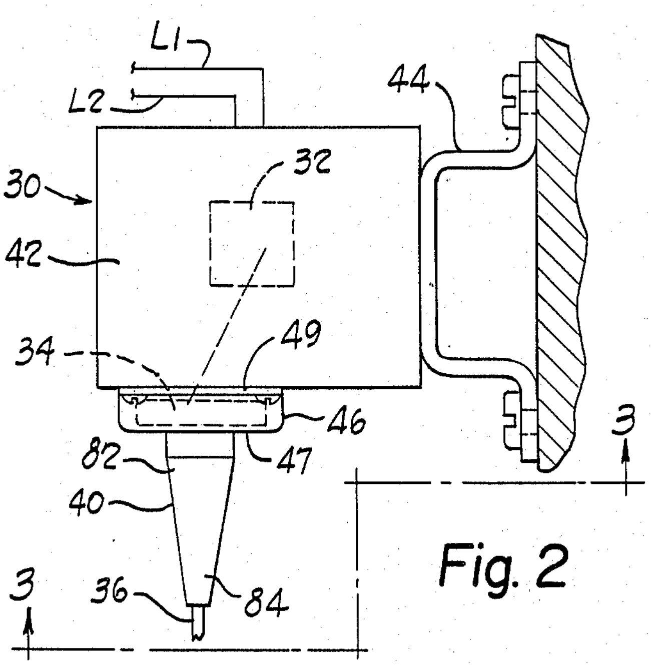
FIG. 2 is a schematic representation of a pressure control device employed in the system of FIG. 1.
Figure 3:
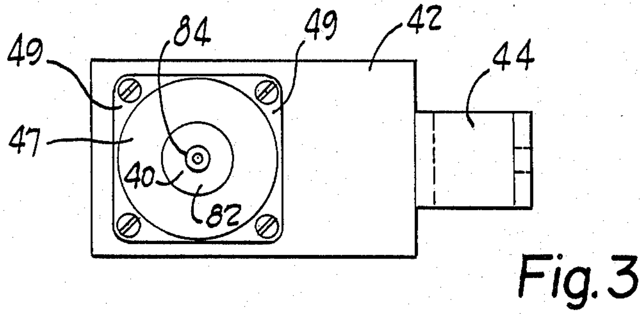
FIG. 3 is a view seen approximately from the planes indicated by the line 3—3 of FIG. 2.
Figure 4:
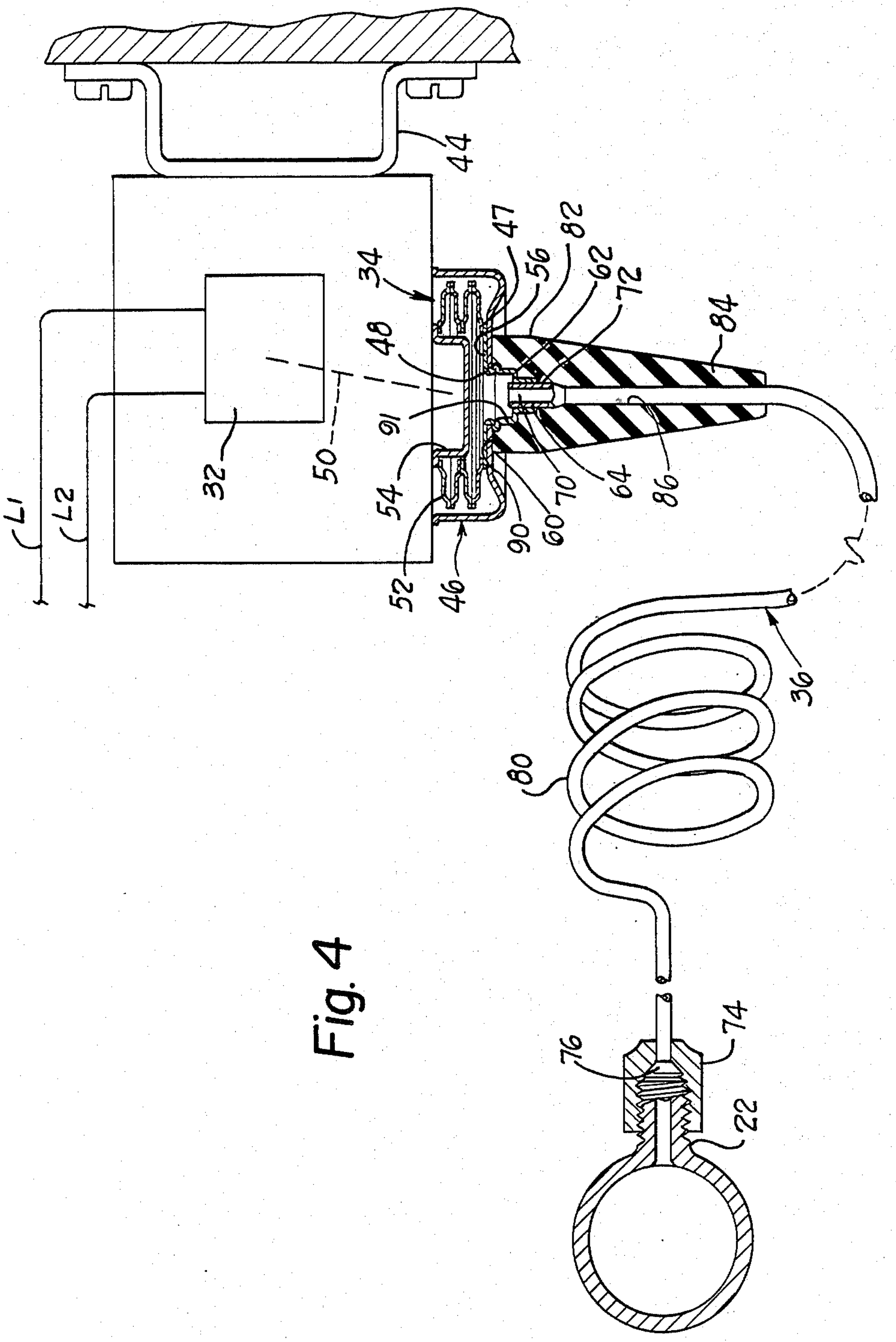
FIG. 4 is a view of the control device similar to FIG. 2 with parts shown in cross-section.

Referring to FIGS. 2–4, the housing assembly 20 comprises a rigid structurally strong support body 42 (schematically illustrated), a mounting bracket 44 by which the support body 42 is attached to the compressor 12, and an actuator support cup 46 by which the actuator is assembled to the support body.

The actuator support cup 46 is preferably a drawn stainless steel cup defining a generally circular rigid base 47 having a centrally located actuator mounting opening 48 (FIG. 4), and a mounting flange 49 which extends about the open end of the cup remote from the base. The cup 46 is assembled to the support body 42 by suitable fasteners, such as screws, associated with the mounting flange.

The switch 32 is schematically illustrated but preferably includes a mechanical or snap switch of suitable construction contained in a switch housing which is fixed to the support body 42 and a linkage 50 which is schematically illustrated as extending between the switch housing and the actuator 34. When compressor head pressures exceed a predetermined level the actuator 34 exerts sufficient force on the linkage 50 to actuate the snap switch assembly and open the contacts to interrupt the power supply to the compressor motor. When sensed head pressure has been reduced to a predetermined lower level the force applied by the actuator to the linkage 50 is reduced sufficiently to enable the snap switch contacts to close for reenergizing the compressor motor.

Referring to FIG. 4, the actuator 34 includes a metal bellows 52 having a force transmitting head section 54 for engaging the linkage 50, and a ferrule-like eyelet 56 about which the bellows is attached to the support cup 46. The bellows 52 is formed by a stack of extremely thin annular stainless steel leaves adjacent ones of which are hermetically welded together at their respective inner and outer peripheries to form a conventional bellows stack. The bellows head 54 comprises a rigid drawn stainless steel cup hermetically welded in place at one end of the bellows to close the bellows and provide a rigid force transmitting surface for engagement with the linkage 50.

The eyelet 56 is likewise a drawn stainless steel member defining a circular plate 60 and a drawn tubular body 62 depending from the central area of the plate and extending through the cup mounting opening 48. The plate 60 is hermetically welded to the bellows about its periphery to seal the end of the bellows opposite from the head 54. The plate 60 is firmly seated on the cup base 47 and in the preferred and illustrated embodiment the eyelet body 62 is upset to form a circumferential rib extending about the opening 48 and crimping the eyelet in place with the plate and base firmly engaged. The body 62 beyond the opening 48 is necked down into a projecting straight sleeve 64 having a diametral extent sized to receive and closely surround the adjacent end of the capillary tube.

The capillary tube 36 is a small diameter supple, or pliant, metal tube (preferably having a diameter of just under 0.1 inch) which has a relatively thin wall so that the tube can be easily flexed and bent around to desired shapes by hand during installation of the device 20. In the illustrated embodiment, the capillary tube has a projecting end 70 extending into the eyelet sleeve 64. The tube end and sleeve are hermetically connected by a brazed joint 72 at their juncture. The opposite end of the capillary tube carries a pressure. fitting 74 which is sealingly engageable with a flared tube end 76 and constructed for sealing engagement with the tap 22 so that refrigerant from the system 10 is introduced into the capillary tube and actuator via the tap 22. The Capillary tube 36 is provided with a series of tube coils 80 between its ends which serve to enable the tube to extend freely between the control device and the tap and tend to dampen the tube vibrations.

The support damper 40 is preferably formed by an elongated tubular body having a generally frusto-conical configuration and composed of a stiffly resilient rubber-like material. The damper body comprises an enlarged first end portion 82 engaging and fixed to the housing assembly, a second end portion 84 projecting away from the housing assembly for engaging the capillary tube remote from the actuator and a tube mounting passage 86 opening in the opposite damper end portions and extending through the damper body.

The enlarged end portion 82 defines a flat annular face 90 extending radially outwardly from the eyelet body 62 in a plane transverse to the direction of extent of the capillary tube end 70. The face 90 confronts and is attached to the cup face 47 by a suitahle bonding process or material (in the preferred embodiment an epoxy-type bonding agent).

In the preferred and illustrated embodiment the damper 40 is generally cylindrical proceeding from the end face 90 to a location just axially beyond the brazed joint 72. The body wall is thickest in this region and the brazed joint is stiffly supported. The remaining projecting part of the damper 40 tapers gradually to the projecting end 84. The passage 86 defines an enlarged end section 91 opening in the face 90 and which is sized to provide for an interference fit over the eyelet body 62 during assembly to aid in fixing the damper face in place.

The passage 86 narrows beyond the enlarged section 91 to provide a snug sliding fit with the capillary tube. In this regard it has been found desirable to provide about a 0.003 inch difference between the diameters of the body passage 86 and the capillary tube. The passage 86 thus is in snug, sliding engagement with the capillary tube from the juncture of the capillary tube and the eyelet to the projecting damper end 84.

The damper 40 is sufficiently stiff that it protects the capillary tube from being sharply bent or kinked in the immediate vicinity of the brazed joint 72, as could conceivably happen during shipment or handling and during installation. The reduced damper body wall thickness adjacent the projecting end 84 is somewhat flexible to allow radiused bending of the adjacent capillary tube.

More importantly however, the engagement of the capillary tube in the damper body passage 86 and the connection between the damper end face 90 and the housing assembly combine to virtually eliminate cyclic flexure of the brazed joint 72 and the capillary tube immediately adjacent that joint which otherwise might be induced by operation of the compressor. Any tendency of these tube portions to flex as a result of vibration is firmly resisted by the damper body which coacts with the housing assembly to buttress the tube.

The capillary tube 36 and the actuator 34 are assembled together by first fixing the actuator 34 to the support cup 46 by crimping the eyelet in place as described previously. The damper 40 is then slid over the capillary tube end 70 and pushed back along the capillary tube away from the end 70. The capillary tube end 70 is then fixtured in place in the eyelet body sleeve 64 and suitable brazing materials are disposed between the tube end and the eyelet body for forming the brazed joint 72.

The assemblage is then subjected to elevated temperatures sufficient to braze the tube and eyelet together. The application of heat is localized to the juncture of the capillary tube end 70 and the eyelet sleeve but, because of the highly conductive nature of the copper capillary tube material, the heating process results in the capillary tube being heated to relatively high temperature throughout a region extending about an inch away from the brazed joint. This elevated temperature results in embrittlement of the capillary tube through a localized region extending, as indicated, a relatively short distance along the capillary tube from the brazed joint. In most instances the embrittled segment of the capillary tube does not extend much more than one inch from the brazed joint.

After the assembly has cooled a bonding material is applied to the damper end face 90 and the damper is slid along the capillary tube toward the housing assembly. The damper is forced onto the eyelet body 62 and maintained in position with the face 90 in firm engagement with the cup face 47 until the damper has been bonded in place.

The length of the damper 40 projecting from the cup 46 is such that the damper extends well beyond the embrittled segment of the capillary tube. The projecting damper end 84 thus engages and supports the capillary tube throughout and beyond the embrittled segment. Moreover, the tapered shape of the damper is designed such that the damper body wall thickness remains large throughout the capillary tube length where embrittlement is expectable. This tends to preclude flexure of the embrittled section. When the compressor operates the capillary tube tends to vibrate because the compressor shakes cyclically and because of the spring and mass formd by the capillary tube extending from the control device 20. This vibration would otherwise tend to cyclically flex the capillary tube along the embrittled segment and at the brazed joint 72. However the damper end portion 84 engages the capillary tube beyond the embrittled segment so that flexural stress which would otherwise be transmitted to the brazed joint or the embrittled segment are transmitted instead to the damper end 84, the damper body itself and to the control housing via the face 90.

Testing of identical control devices with and without the damper 40 has shown that controls equipped with the damper 40 have a remarkable resistance to capillary tube breakage in the areas of the brazed joint and embrittled segment when subjected to vibrations. Controls equipped with capillary tube stiffening springs and tight fitting plastic sleeves, while effective to prevent crimping and sharp bending of the capillary tube in the vicinity of the brazed joint, have been ineffective to prevent prompt fatigue fractures in the critical areas as a result of vibration.

While only a single embodiment of the present invention has been illustrated and described in detail the present invention is not to be considered limited to the precise construction shown. For example, the damper 40 could be applied to a control device operated to sense temperature by the use of a hermetically sealed capillary tube extending from the control housing. Furthermore the actuator might be utilized to actuate a control device other than a switch, for example a valve. In addition, the specific construction of the damper 40 might be changed without altering its function. Various adaptations, modifications and uses of the invention may occur to those skilled in the art to which the invention relates and the intention is to cover all such adaptations, modifications and uses which fall within the scope or spirit of the appended claims.

I claim:

1. A control device comprising a support housing assembly, an expansible chamber actuator, means rigidly connecting said actuator to said support housing assembly, a capillary tube bonded to the actuator, and a capillary tube supporting damper, said damper comprising a stiffly resilient rubber-like damper body engaging and supporting the capillary tube at a location spaced away from its junction with the actuator and transmitting flexural forces from said location to said housing assembly via said body, said damper body stiffly supporting said capillary tube at the bonded juncture of said tube and actuator to minimize cyclic flexure of the tube adjacent said juncture.

2. The control device claimed in claim 1 wherein said damper comprises a tubular member fixed to said housing assembly adjacent the juncture of said capillary tube and actuator.

3. The control device claimed in claim 2 wherein said damper body is of generally frusto-conical configuration with the enlarged end defining a face bonded to said support housing assembly, said damper body extending to said location and defining a capillary tube engaging passage snugly engaging and supporting said capillary tube between said location and said housing assembly.

4. A control device comprising a supporting housing assembly, controller means fixed to said housing assembly, an expansible chamber actuator supported by said housing assembly for actuating said controller means, means rigidly connecting said actuator to said housing assembly, a capillary tube connected to said actuator by a brazed joint, said capillary tube including an embrittled segment extending from the juncture of said tube and actuator, and a vibration damper for minimizing vibrational flexure of said capillary tube, said damper comprising a stiffly resilient rubber-like body having a first end section fixed to said housing assembly at a location spaced radially outwardly from the brazed joint, a second end section remote from said housing assembly and a passage extending between said end sections for engaging and supporting said capillary tube, said passage extending along the length of said embrittled section.

5. The control device claimed in claim 4 wherein said first end section has a large diametral extent compared to the diametral extent of said second end section, said body tapering between said end sections to define a capillary tube supporting wall having a thickness which progressively decreases proceeding toward said second end section, said second end section disposed along said capillary tube beyond said embrittled section.

6. The device claimed in claim 5 wherein said first end section is bonded to said housing assembly.

7. The device claimed in claim 6 wherein said housing assembly defines a surface disposed radially outwardly from said brazed joint and said first end section defines a face confronting said surface, said face and surface attached together by a bonding material between them.

* * * * *